United States Patent
Xu

(10) Patent No.: US 7,263,287 B2
(45) Date of Patent: Aug. 28, 2007

(54) METHOD AND APPARATUS FOR ASSESSING PERFORMANCE OF OPTICAL SYSTEMS

(75) Inventor: Yu Xu, St. Albans (GB)

(73) Assignee: Agilent Technologies, Inc., Santa Clara, CA (US)

(*) Notice: Subject to any disclaimer, the term of this patent is extended or adjusted under 35 U.S.C. 154(b) by 631 days.

(21) Appl. No.: 10/762,699

(22) Filed: Jan. 22, 2004

(65) Prior Publication Data
US 2004/0184802 A1 Sep. 23, 2004

(30) Foreign Application Priority Data
Mar. 21, 2003 (GB) ................................ 0306533.1

(51) Int. Cl.
*H04B 10/08* (2006.01)

(52) U.S. Cl. ............................ 398/27; 398/25; 398/26; 398/182; 398/183; 398/186; 398/187; 398/192; 398/193; 398/194; 398/195; 398/196; 398/197; 398/198; 398/200; 398/30; 398/32; 398/33; 385/123; 385/126; 385/122

(58) Field of Classification Search ................ 714/704; 398/182, 5, 30, 183, 186, 187, 192, 193, 398/194, 195, 196, 197, 198, 200, 25, 26, 398/27, 32, 33; 385/123, 126, 122
See application file for complete search history.

(56) References Cited

U.S. PATENT DOCUMENTS

| | | | |
|---|---|---|---|
| 5,325,397 A | 6/1994 | Scholz et al. ................. 375/10 |
| 5,617,238 A * | 4/1997 | Bogdan et al. ............. 398/182 |
| 5,764,651 A | 6/1998 | Bullock et al. ............. 371/5.5 |
| 6,008,916 A | 12/1999 | Khaleghi ................... 359/110 |
| 6,069,718 A | 5/2000 | Khaleghi ................... 359/110 |
| 6,229,631 B1 * | 5/2001 | Sato et al. .................... 398/30 |
| 6,580,531 B1 * | 6/2003 | Swanson et al. ............... 398/5 |
| 2003/0191990 A1 * | 10/2003 | Reynolds et al. ........... 714/704 |

FOREIGN PATENT DOCUMENTS

| | | |
|---|---|---|
| EP | 1 326 362 | 7/2003 |
| WO | WO 01/50556 | 7/2001 |

OTHER PUBLICATIONS

Zhou et al. "Measurements of Very Low Bit-Error Rates of Optical Switches Based on Semiconductor Optical Amplifiers". IEEE Photonics Technology Letters, vol. 9, No. 8, Aug. 1997, pp. 1131-1133.

Galloway et al. "Rapid Testing of Extremely Low BER". http://ftp.agilent.com/pub/semiconductor/morpheus/docs.low_ber.pdf, Optical Network Interface Design Symposium (ONIDS), Paper 4, Jul. 10, 2004.

(Continued)

*Primary Examiner*—Hanh Phan

(57) ABSTRACT

An apparatus for accelerating assessment of an optical transmission system using Bit Error Rate (BER) tests calculates Q-factors for at least two different extinction ratios from measured test BER values, and extrapolates to determine a Q-factor for an operational extinction ratio, whereby the operational BER value for the operational extinction ratio can be calculated.

10 Claims, 3 Drawing Sheets

OTHER PUBLICATIONS

Palacharla, P. et al. "Techniques for Accelerated Measurement of Low Bit Error Rates in Computer Data Links," 1995, IEEE.

Bergano et al. "Margin Measurement in Optical Amplifier Systems," 1993, IEEE.

Standards Proposal No. 3696, Proposed New Standard "Accelerated Measurement of BER and Q-Factor in Digital Optical Transmission Systems Using the Sinusoidal Interference Method." May 26, 2000.

* cited by examiner

METHOD AND APPARATUS FOR ASSESSING PERFORMANCE OF OPTICAL SYSTEMS

FIELD OF THE INVENTION

This invention relates to a method and apparatus for assessing performance of optical systems, and particularly, though not exclusively, to such a method and apparatus for accelerating assessment of performance using bit error rate (BER) tests.

BACKGROUND OF THE INVENTION

In an assessment of the performance of optical transmission systems, bit error rate (BER) tests are usually used. BER is defined as the ratio between the number of erroneously received bits to the total number of bits received over a period of time. In modern optical transmission systems, the BER test normally takes a long time to perform. For example, to evaluate a BER of $10^{-14}$ for data that is transmitted at a bit rate of 2.5 Gb/s, the measurement time needed is 12 hours. Performance of an optical system can also be defined by a parameter called Q-factor. The Q-factor indicates the signal-to-noise ratio of the signal and is defined as:

$$Q = \frac{\mu_1 - \mu_0}{\sigma_1 + \sigma_0}$$

where $\mu_1$ is the mean value of the "1's", $\mu_0$ is the mean value of the "0's", $\sigma_1$ is the standard deviation of the level of "1's" and $\sigma_0$ is the standard deviation of the level of "0's". Q-factor measurement can greatly accelerate the test. Through reducing test time, the efficiency and benefit in cost and time can be obtained in design, manufacture, installation, maintenance and monitor of optical transmission systems.

Several methods have been proposed to estimate the BER by calculation of the Q-factor. For example, one method disclosed in an article entitled "Margin Measurements in Optical Amplifier Systems" by Neal S. Bergano, F. W. Kerfoot and C. R. Davidson, published in IEEE Photonics Technology Letters, Vol. 5, No. 3, March 1993, adjusts the 'Decision Threshold' level of a tester's receiver away from the optimal value which gives the minimum BER. The shift of the decision threshold level increases the BER measured to a high level that is measurable in a short time. The measured high BER values are then used to mathematically extrapolate to the BER at the optimal decision threshold.

Another known method is the 'Light Interference' method, which was described by P. Palacharla, J. Chrostowski and R. Neumann in a paper entitled "Techniques for Accelerated Measurement of Low Bit Error Rates in Computer Data Links" published in the *Proceedings of the IEEE Fourteenth Annual International Phoenix Conference on Computers and Communications*, Scottsdale, Ariz., Mar. 28-31, 1995, pp.184-190. In this method, a sinusoidal interfering light source is coupled to the transmission data signal to increase the BER measured at the receiver, allowing the high BER to be measured in a short time. Through the resultant Q-factor measurement, BER in the absence of the interference signal can then be extrapolated.

BRIEF SUMMARY OF THE INVENTION

The present invention seeks to provide an alternative method and apparatus for accelerating assessment of performance using bit error rate (BER) tests, as compared to the prior art.

Accordingly, in a first aspect, the invention provides an apparatus for accelerating assessment of an optical transmission system using Bit Error Rate (BER) tests, the apparatus comprising a controllable laser transmitter and a data generator coupled to the controllable laser transmitter for modulating the laser transmitter with transmission data, the controllable laser transmitter having an output coupled to an optical transmission system to be assessed, a BER measurement unit coupled to an output of the optical transmission system, a processing unit coupled to the BER measurement unit and to a laser controller coupled to the controllable laser transmitter for adjusting the extinction ratio of the controllable laser transmitter to provide relatively high test BER values at the BER measurement unit, the processing unit including a calculator for calculating a Q-factor for at least two different values of the extinction ratio from the relatively high measured test BER values and for obtaining a Q-factor value by extrapolation therefrom for an extinction ratio of the controllable laser transmitter in normal operation thereby enabling the BER to be calculated for normal operation of the controllable laser transmitter.

The controllable laser transmitter may be an electrically and directly modulated laser diode which outputs a digital light signal, the light output of the laser diode being modulated by the transmission data.

In one embodiment, the data generator may be a Pseudo Random Bit Sequence (PRBS) Generator.

The optical transmission system may include a forward error correct (FEC) element.

According to a second aspect, the invention provides a method for accelerating assessment of an optical transmission system using Bit Error Rate (BER) tests, the method comprising the steps of generating test data for modulating a laser transmitter, outputting light from the laser transmitter modulated by the test data, receiving the modulated light via an optical transmission system, measuring the BER for the received light, adjusting an extinction ratio of the laser transmitter to produce relatively high measured BER values, calculating a Q-factor for at least two different values of the extinction ratio from the measured BER values, obtaining a Q-factor by extrapolation therefrom for an extinction ratio of the laser transmitter in normal operation, and calculating the BER for normal operation of the laser transmitter.

The step of generating data may involve generating Pseudo Random Bit Sequence (PRBS) data. In one embodiment, the method may further comprise the step of forward error correction (FEC) in the optical transmission system prior to measurement of BER values.

The step of outputting light from the laser transmitter may comprise modulating the light output of a laser diode of the laser transmitter to provide a digital output light signal.

BRIEF DESCRIPTION OF THE DRAWINGS

Two embodiments of the invention will now be more fully described, by way of example, with reference to the drawings, of which.

DETAILED DESCRIPTION OF THE DRAWINGS

Figure 3:
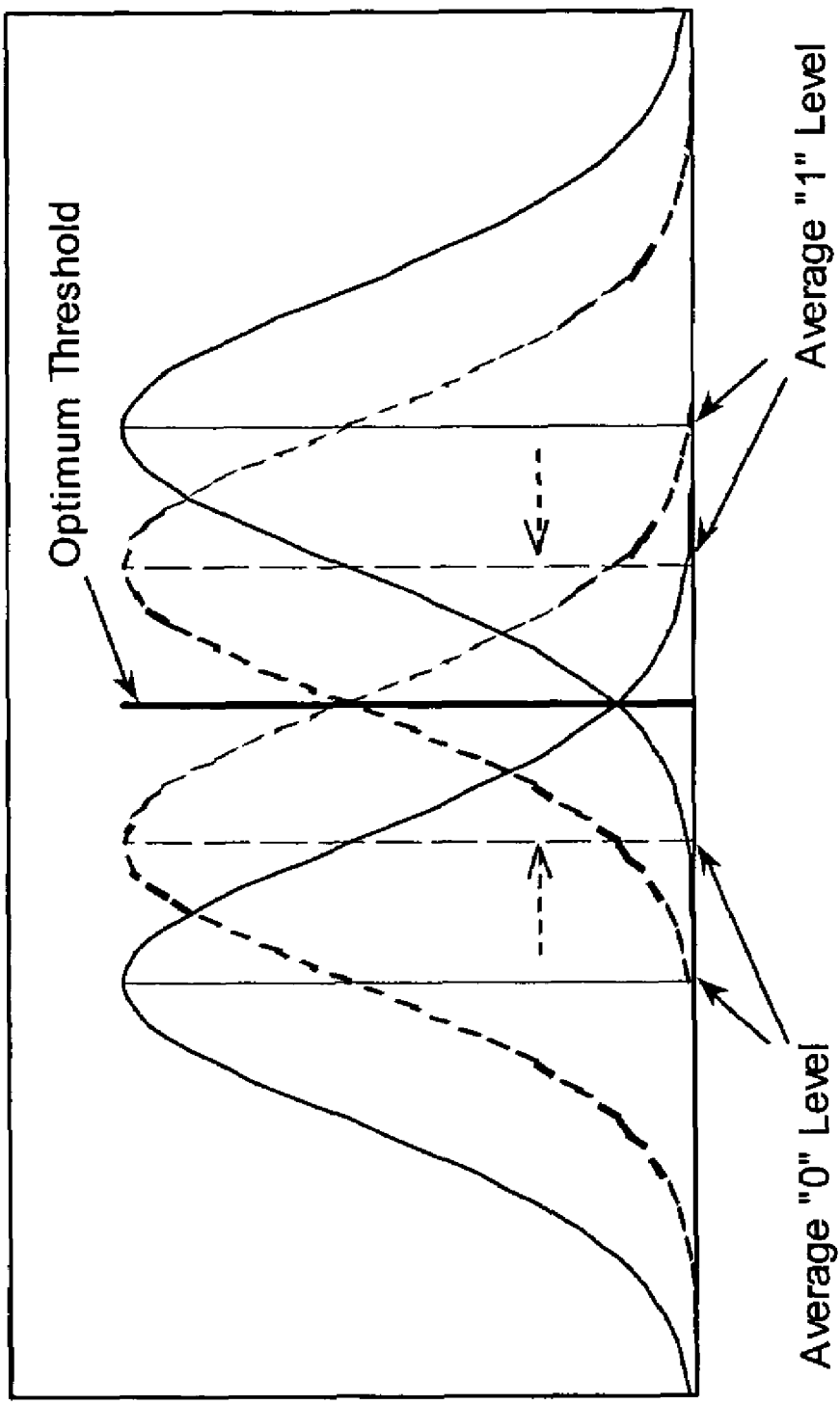
FIG. 3 shows an example of Gaussian probability distribution of binary signals in optical transmission systems with two different extinction ratios.

Thus, FIG. 3 shows, as an illustrative example, Gaussian probability distributions of binary signals in an optical transmission system for two different extinction ratios of a laser transmitter. The continuous line shows the distributions of the average "0" level and the average "1" level at a higher extinction ratio and the dotted line shows the distributions at the lower extinction ratio. As can be seen, although the spacing of the "0" and "1" distributions has changed, so that they are much closer together at the lower extinction ratio, the average power of the transmission data signal at the different extinction ratios is unchanged. Thus, without changing the average power of the optical transmission data signal nor the decision threshold of the receiver, there is still more area of overlap between the "1" and "0" probability distributions as the extinction ratio of the laser transmitter decreases. Therefore, the bit error rate (BER) increases as the extinction ratio decreases, resulting in a higher BER to be measured.

Figure 1:
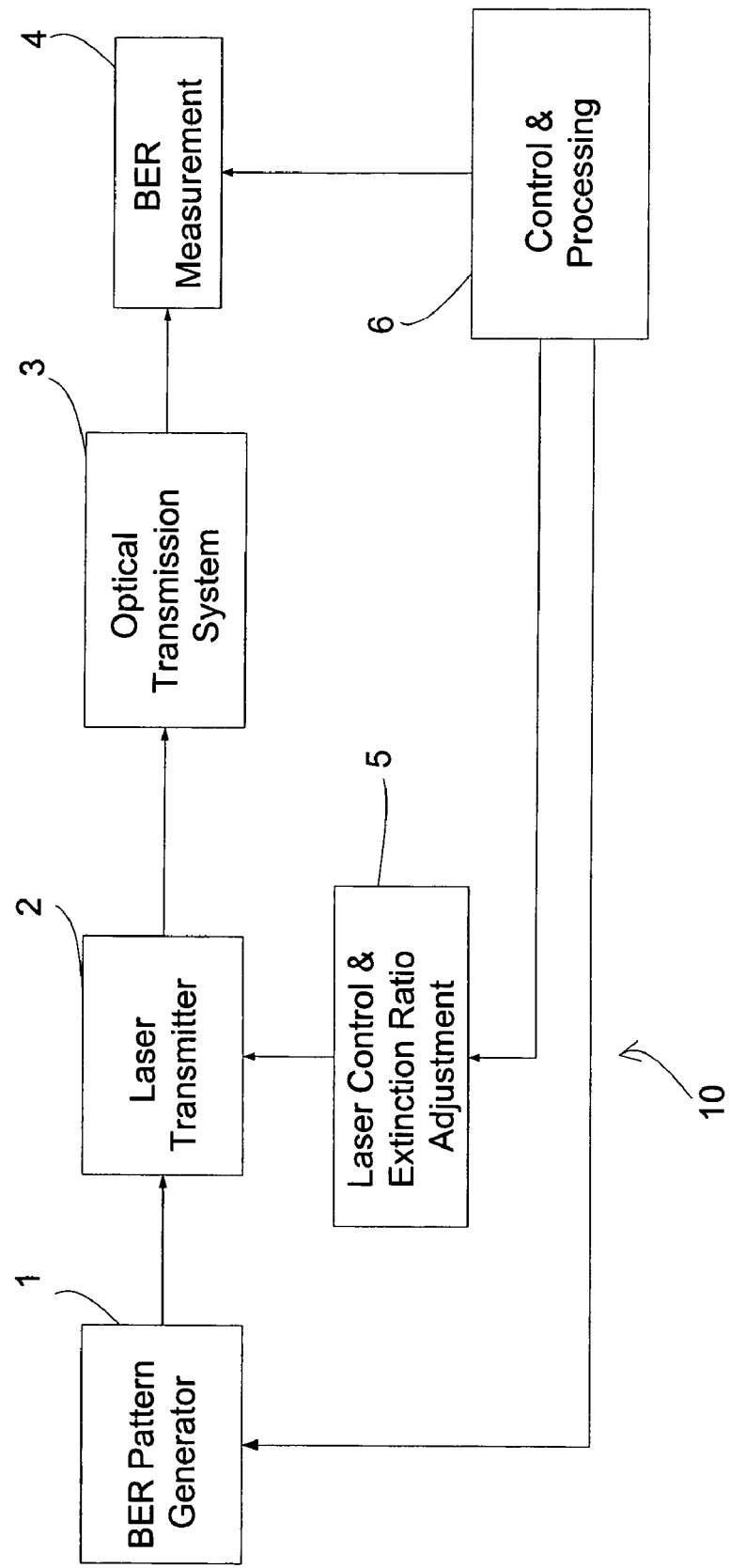
FIG. 1 shows, schematically, an apparatus according to a first embodiment of the present invention for accelerated assessment of an optical transmission system.

FIG. 1 shows an apparatus 10 for accelerated assessment of an optical transmission system 3. The apparatus includes a data pattern generator 1, which is coupled to a laser transmitter 2. The data pattern generator 1 outputs a pseudo random bit sequence (PRBS) of test data which is used to modulate the light output of the laser transmitter 2. The laser transmitter may include a laser diode, which is modulated by the test data. The modulated output of the laser transmitter (laser diode) 2 is inserted into the optical transmission system 3 under test. The output data signal from the optical transmission system 3 is detected by a BER measurement unit 4. The measured BER values are passed to a control and processing module 6. The control and processing module 6 is used to control the operation of the whole test set and to process the received data for BER measurement and Q-factor calculation. In order to reduce the time taken for the BER measurements to be carried out, a laser controller 5 is used to adjust the extinction ratio of light output from the laser transmitter 2. The control and processing module 6 thus controls the extinction ratio of the laser transmitter 2 and, from the BER values received from the BER measurement unit 4, and the associated extinction ratios, determines a BER value for the system under optimum conditions.

The relationship between Q-factor and BER will now be explained. BER is defined by:

$$BER = p(1)P(0/1) + p(0)P(1/0) \quad (1)$$

where p(1),p(0) and P(1/0),P(0/1) represent the probabilities and the conditional (Gaussian) probabilities of "1" level and "0" level signals, respectively.

For a Gaussian noise system, the conditional probabilities are expressed as:

$$P(1/0) = \frac{1}{2} erfc\left(\frac{\mu_{th} - \mu_0}{\sqrt{2}\,\sigma_0}\right) \quad (2)$$

-continued
$$P(0/1) = \frac{1}{2} erfc\left(\frac{\mu_1 - \mu_{th}}{\sqrt{2}\,\sigma_1}\right) \quad (3)$$

where $\mu_1$ and $\mu_0$ represent the average power of "1" level, "0" level signals and $\mu_{th}$ represents the threshold level of the receiving decision circuit; $\sigma_1$ and $\sigma_0$ represent the root mean square (rms) noise level for the "1" level and "0" level signals, respectively, and erfc is an error function.

Thus, BER can be expressed as:

$$BER = \frac{1}{4} erfc\left(\frac{\mu_{th} - \mu_0}{\sqrt{2}\,\sigma_0}\right) + \frac{1}{4} erfc\left(\frac{\mu_1 - \mu_{th}}{\sqrt{2}\,\sigma_1}\right) \quad (4)$$

The minimum bit error rate (BER) occurs at an optimal threshold $\mu_{th\text{-}optimal}$, when the two terms in Equation (4) are equal, that is:

$$\frac{\mu_{th} - \mu_0}{\sigma_0} = \frac{\mu_1 - \mu_{th}}{\sigma_1} = Q \quad (5)$$

Hence, BER can be expressed as:

$$BER = \frac{1}{2} erfc\left(\frac{Q}{\sqrt{2}}\right) = \frac{1}{2} erfc\left[\frac{\sqrt{2}\,\mu_{avg}(r_{ER} - 1)}{(\sigma_1 + \sigma_0)(r_{ER} + 1)}\right] \quad (6)$$

where the Q-factor is defined as: $Q=(\mu_1-\mu_0)/(\sigma_1+\sigma_0)$, the average signal power is defined as: $\mu_{avg}=(\mu_1+\mu_0)/2$, and the extinction ratio of the signal is defined as: $r_{ER}=\mu_1/\mu_0$. From Equation (6), it can be seen that the BER can be mathematically expressed in terms of the extinction ratio of the signal.

Thus, in order to test the system to provide the BER for the system in operation, the extinction ratio of the laser transmitter 2 is adjusted by the laser controller 5 to a first low value so that the BER measured by the BER measurement module is high. Thus, the measurement can take place in a relatively short period of time. Using equation (6), the processing module 6 can then calculate the Q-factor for that first extinction ratio value. The laser controller then sets the extinction ratio to a second low value and the BER is again measured and the Q-factor is calculated for that second extinction ratio value. Thus, the Q-factor for much higher extinction ratio values can be extrapolated from the Q-factor values at low extinction ratios. The processing module 6 carries out the extrapolation to determine the Q-factor for operational extinction ratio values and then calculates the BER. In this way, the optimum extinction ratio to provide the lowest BER can be determined.

Figure 2:
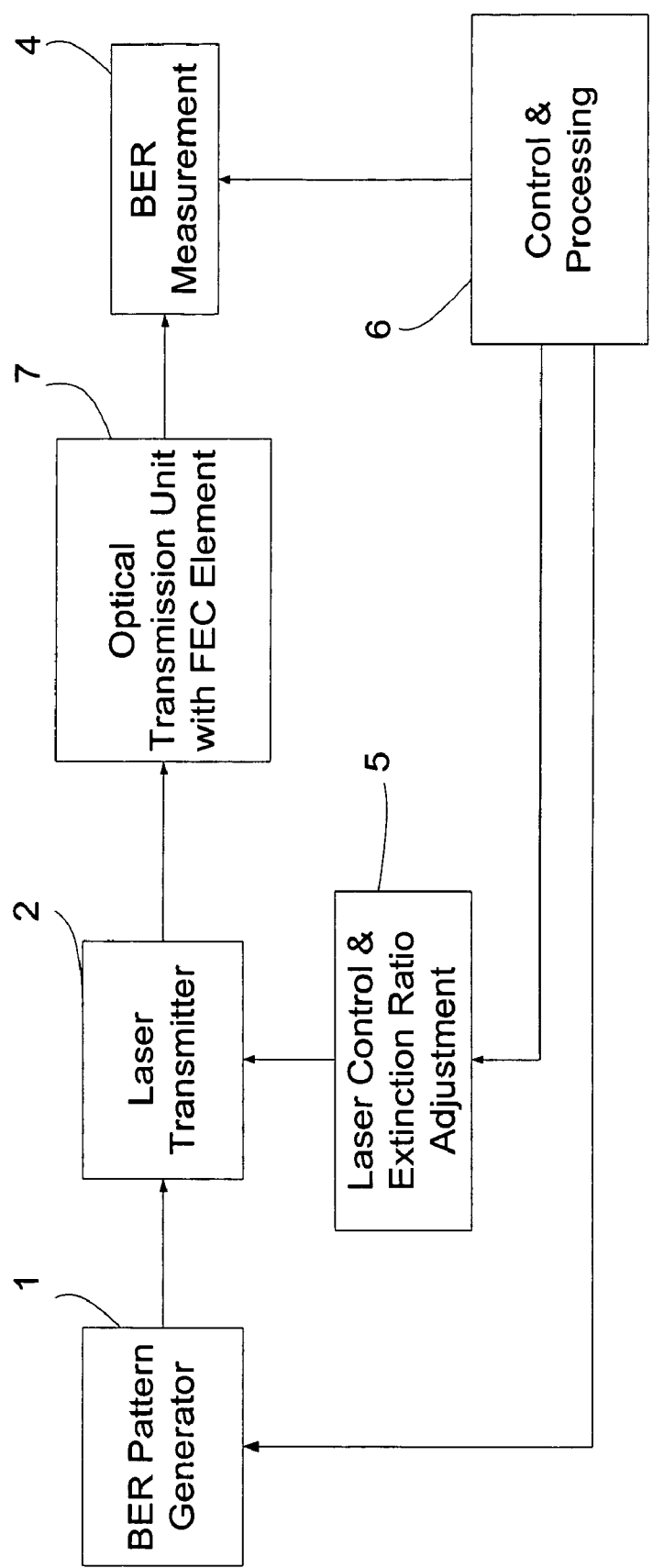
FIG. 2 shows, schematically, an apparatus according to a second embodiment of the present invention for accelerated assessment of an optical transmission system.

A second embodiment of the invention will now be described with reference to FIG. 2, in which the same elements as those of FIG. 1 have the same reference numbers. Again, a BER pattern generator 1 outputs a pseudo random bit sequence (PRBS) transmission data signal to laser transmitter 2, the laser diode of which outputs light modulated with PRBS transmission data into an optical transmission system 7 which, in this case, includes a forward error correct (FEC) element. The output data signal from the optical transmission system 7 is detected by the BER measurement unit 4. The extinction ratio of the light output of the laser transmitter 2 can be adjusted to result in high BER values in the system under test. The control & processing module 6 is used to control the work and operation of the whole test set and to process the received data for BER measurement and Q-factor calculation and to extrapolate to determine optimal BER. The accelerated BER testing through Q-factor measurement allows evaluation of how the FEC element corrects and improves the quality of the transmission data signal.

Again, the extinction ratio values of the laser transmitter 2 are set so as to generate a high BER after passing through the optical transmission system 7. However, for an optical transmission system with an FEC element, setting the second extinction ratio to a value different to the first extinction ratio value may not provide a different BER measurement because the FEC element corrects and improves the quality of the transmission data signal so that the BER measurement may well be very similar for the second extinction ratio value as for the first extinction ratio value. Thus, in this embodiment, the second extinction ratio of the laser transmitter is adjusted continuously by the laser controller 5 until the processing module 6 receives a measured BER that is substantially different to the BER measured for the first extinction ratio value. In this way, the relationship between the extinction ratio values and the Q-factor can be properly determined so that the BER at the operational extinction ratio values can be extrapolated.

It will thus be apparent that the present invention can be used to assess relatively quickly optical transmission systems having relatively low operational BER.

It will be appreciated that although only two particular embodiments of the invention have been described in detail, various modifications and improvements can be made by a person skilled in the art without departing from the scope of the present invention. For example, the PRBS data from the BER pattern generator can generate data signal for the assessment of various types of optical transmission systems, such as SONET/SDH.

The invention claimed is:

1. Apparatus for accelerating assessment of an optical transmission system using Bit Error Rate (BER) tests, the apparatus comprising a controllable laser transmitter and a data generator coupled to the controllable laser transmitter for modulating the light output of the laser transmitter with test transmission data, the controllable laser transmitter having an output coupled to an optical transmission system to be assessed, a BER measurement unit coupled to an output of the optical transmission system, a processing unit coupled to the BER measurement unit and to a laser controller coupled to the controllable laser transmitter for adjusting the extinction ratio of the controllable laser transmitter to provide relatively high test BER values at the BER measurement unit, the processing unit including a calculator for calculating a Q-factor for at least two different values of the extinction ratio from the relatively high measured test BER values and for obtaining a Q-factor value by extrapolation therefrom for an extinction ratio of the controllable laser transmitter in normal operation thereby enabling the BER to be calculated for normal operation of the controllable laser transmitter.

2. Apparatus according to claim 1, wherein the data generator is a Pseudo Random Bit Sequence (PRBS) generator.

3. Apparatus according to claim 1, wherein the controllable laser transmitter comprises an electrically and directly modulated laser diode which outputs a digital light signal, the light output of the laser diode being modulated by the test transmission data.

4. Apparatus according to claim 1, wherein the optical transmission system includes a forward error correct (FEC) element.

5. Apparatus according to claim 4, wherein the laser controller comprises a continuous controller for continuously adjusting the extinction ratio of the controllable laser transmitter to provide a second relatively high test BER value substantially different to a first relatively high test BER value at the BER measurement unit.

6. A method for accelerating assessment of an optical transmission system using Bit Error Rate (BER) tests, the method comprising the steps of:
generating test data for modulating light output of a laser transmitter;
outputting light from the laser transmitter modulated by the test data;
receiving the modulated light via an optical transmission system;
measuring the BER for the received light;
adjusting an extinction ratio of the laser transmitter to produce relatively high measured BER values;
calculating a Q-factor for at least two different values of the extinction ratio from the measured BER values;
obtaining a Q-factor by extrapolation therefrom for an extinction ratio of the laser transmitter in normal operation; and
calculating the BER for normal operation of the laser transmitter.

7. A method according to claim 6, wherein the step of generating data comprises generating Pseudo Random Bit Sequence (PRBS) data.

8. A method according to claim 6, wherein the step of outputting light from the laser transmitter comprises modulating the light output of a laser diode of the laser transmitter to provide a digital output light signal.

9. A method according to claim 6, further comprising the step of forward error correction (FEC) in the optical transmission system prior to measurement of BER values.

10. A method according to claim 9, wherein the step of adjusting an extinction ratio of the laser transmitter comprises continuously adjusting the extinction ratio of the laser transmitter to provide a second relatively high test BER value substantially different to a first relatively high test BER value.

* * * * *